(12) United States Patent
Pennaz

(10) Patent No.: US 6,726,013 B2
(45) Date of Patent: Apr. 27, 2004

(54) CONTAINER WITH LABEL FOR MONITORING USE

(75) Inventor: Thomas J. Pennaz, Champlin, MN (US)

(73) Assignee: Morgan Adhesives Company, Stow, OH (US)

(*) Notice: Subject to any disclaimer, the term of this patent is extended or adjusted under 35 U.S.C. 154(b) by 83 days.

(21) Appl. No.: 10/079,700

(22) Filed: Feb. 22, 2002

(65) Prior Publication Data

US 2002/0079692 A1 Jun. 27, 2002

Related U.S. Application Data

(62) Division of application No. 09/732,604, filed on Dec. 8, 2000.
(60) Provisional application No. 60/169,844, filed on Dec. 9, 1999.

(51) Int. Cl.⁷ .............................. B65D 85/00; G09F 3/00
(52) U.S. Cl. ................................. 206/459.1; 206/459.5; 40/310; 40/446
(58) Field of Search ................. 206/459.1, 459.5; 73/432.1; 40/310, 446; 283/85

(56) References Cited

U.S. PATENT DOCUMENTS

| | | | |
|---|---|---|---|
| 4,789,073 A | * 12/1988 | Fine | 40/324 |
| 5,290,346 A | * 3/1994 | Fujioka | 106/31.32 |
| 5,518,927 A | 5/1996 | Malchesky et al. | 436/1 |
| 5,553,735 A | * 9/1996 | Kimura | 40/324 |
| 5,846,682 A | * 12/1998 | Murofushi et al. | 106/31.32 |

FOREIGN PATENT DOCUMENTS

| | | |
|---|---|---|
| CH | 672512 A5 | 11/1989 |
| EP | 0 117 390 | 9/1984 |
| EP | 0 149 784 | 7/1985 |
| EP | 0 779 353 | 6/1997 |
| WO | WO 95/04955 | 2/1995 |

* cited by examiner

Primary Examiner—Anthony D. Stashick
Assistant Examiner—Troy G Arnold, III
(74) Attorney, Agent, or Firm—Barnes & Thornburg; Timothy J. Engling

(57) ABSTRACT

A system, container, and a label for monitoring the use of a container. The label is ideally inserted into the wall of the container. The label preferably includes an indicating ink that incrementally changes color or changes shade when certain external energy sources are applied. The labeled container can be used in a system of monitoring, characterizing, and recording information and traits regarding containers wherein the incremental changes in the indicating ink are measured. The information, such as counting cycles of container use, is preferably machine-readable, as well as human-readable.

15 Claims, 5 Drawing Sheets

CONTAINER WITH LABEL FOR MONITORING USE

RELATED U.S. APPLICATION DATA

This application has priority to U.S. Provisional Application Ser. No. 60/169,844, filed Dec. 9, 1999, and is a divisional of application Ser. No. 09/732,604, filed Dec. 8, 2000.

BACKGROUND OF THE INVENTION

The present invention relates to technology for monitoring, characterizing, and recording information and traits regarding the use and reuse of containers. More specifically, the invention is directed toward a system and a label for monitoring the use of a labeled container.

The world trend in recent years is to be environmentally friendly and to preserve resources. Many countries, such as Germany, are very concerned about recycling products through refilling and reusing containers. This invention is directed toward such recycling efforts to reuse or refill containers rather than shredding containers to be reprocessed into new containers. Recycling is extremely important in the container and bottling industry where throwaway yet recyclable containers are becoming more popular and growing in number. To control this increasing concern, governments and businesses are considering regulating or monitoring the minimum number of cycles for each container and the capability of recycling, primarily refilling or reusing, a container. For such efforts to be successful, technology is needed to monitor recycling activities.

The present invention involves a system of using labels for monitoring the use of containers for numerous types of information and traits, including the number of cycles that the container is used or exposed to an energy pulse. The preferred embodiment of this invention uses techniques to insert-mold a label inside a container. Insert molding is significant to recycling because the washing and handling of containers during recycling is designed to remove labels and their adhesives. The preferred embodiment also uses regular ink and an indicating ink that changes gradation (either color or shade) when subjected to an energy source, which may be monitored or read by a spectrophotometer or other machine or electronic means.

Other methods of monitoring use information include permanently numbering each container or batch of containers and monitoring that numbering system. Also, on a small scale, containers may be cumulatively marked during each cycle, and the number of marks can be counted. Further, permanent information can be included on containers, such as the type of plastic, which is sometimes indicated by a numerical code on the bottom of a plastic container, for example "1" is formed in the bottom of a PETE container. Since billions of containers are used annually, these methods could be very cumbersome, ineffective, and costly on a large scale.

The prior art methods greatly reduce line speeds and add prohibitive expense to recycling efforts that monitor container use. Monitoring the cycle count or gathering information regarding the containers is presently a serious limitation for high speed recycling of containers.

Accordingly, it would be desirable to provide a system, which has an automatically generated energy signal and which is machine-readable for high speed processing. It has therefore been found beneficial to produce a label that can be monitored at high line speed and that can be read with a spectrophotometer or other monitoring device.

SUMMARY OF THE INVENTION

It is a primary objective of the present invention to enhance the capability to recycle containers primarily through reuse or refilling. The system, container, and label for monitoring the use of a container include a label that is preferably inserted into the wall of the container. The label substrate preferably includes an indicating ink that incrementally changes gradation (either a color or shade change) when an external energy source is applied. The labeled container can be used in a system of monitoring, characterizing, and recording information and traits regarding containers. The information, such as counting cycles of container use, is preferably machine-readable, as well as human-readable.

The present invention overcomes certain problems with reduced line speeds while still having an embodiment that is human readable as well as machine-readable to determine the cycle count or other information.

In a preferred embodiment, the invention may include a label with incrementally changeable ink that is insert-molded between the wall surfaces of the container. Insert molding makes the label durable and able to withstand the processing to which containers are subjected. It is contemplated that other information can be included on the label.

BRIEF DESCRIPTION OF THE DRAWINGS

The above mentioned and other features of this invention and the manner of obtaining them will become more apparent, and the invention itself will be best understood by reference to the following description of embodiments of the invention taken in conjunction with the accompanying drawings in which.

DETAILED DESCRIPTION OF THE INVENTION

Figure 1:
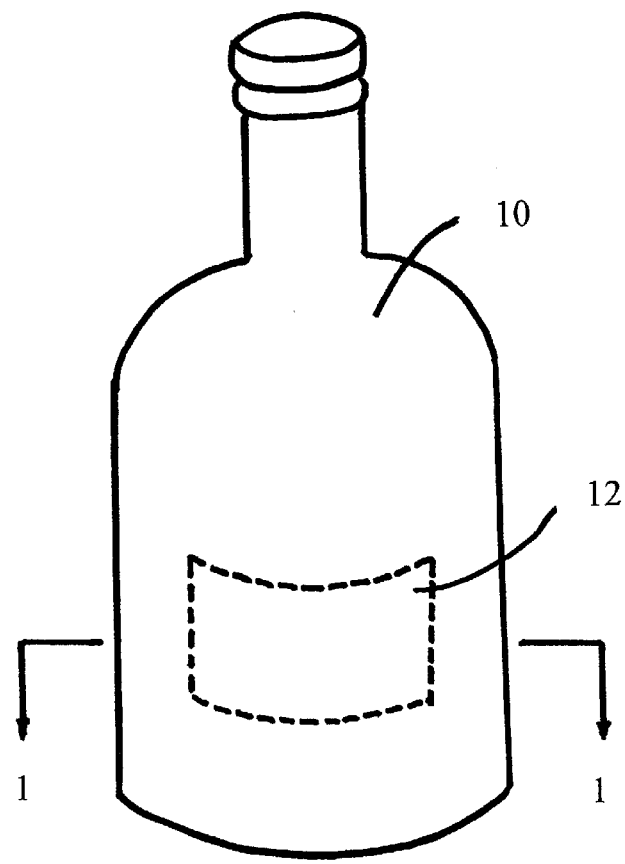
FIG. 1 shows a perspective view of a labeled container of the present invention.

In the Figures, like reference numerals indicate the same elements throughout. FIG. 1 shows a container 10, specifically a bottle, that includes an insert-molded label 12. An example of such a container 10 is a clear plastic, i.e., polyethylene terephthalate (PET), water bottle.

Figure 2:
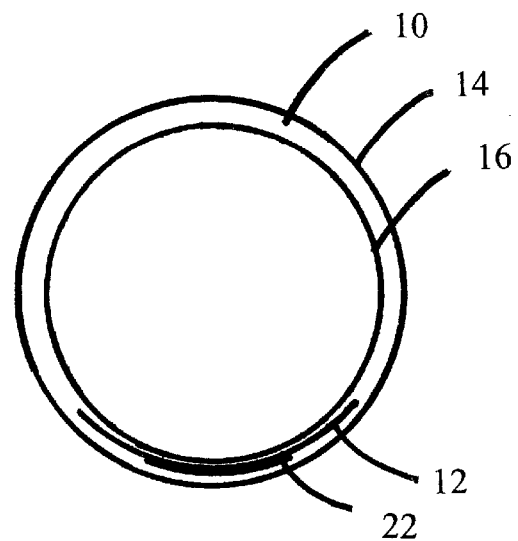
FIG. 2 is a top view that shows a cross section of the labeled container of FIG. 1 taken at line 1—1.

In greater detail, with reference first directed to FIG. 2, a label 12 embodying one aspect of the invention is illustrated. Ideally, the label 12 is inserted between the container outside wall surface 14 and the container inside wall surface 16. The preferred inserted label 12 is insulated from the contents of the container 10 and from wear and tear of the environmental and external conditions. Permanently inserted labels are also significant to recycling because the washing and handling of containers during recycling are designed to remove labels and their adhesives and printing from the container wall surfaces 14 and 16. If a label were affixed to the outside wall surface, the removal of the label would not allow the cycle of the container 10 to be counted. In mold labels will usually survive the wash or sterilization cycle during recycling. For the counting or information gathering system to work, however, it is not required that the label 12 be inserted between the container wall surfaces 14 and 16, but merely that the label 12 remain on the container 10 through more than one cycle.

Figure 3:
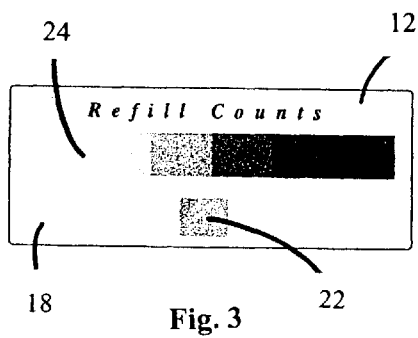
FIG. 3 shows a human or machine-readable label with an indicating ink and control colors.
Figure 4:
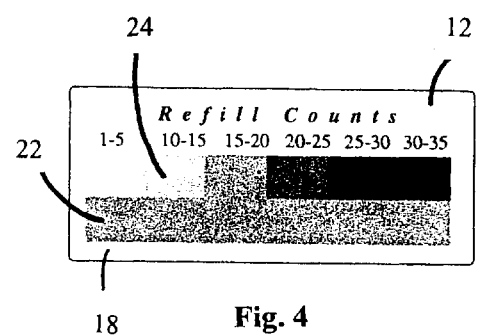
FIG. 4 shows another embodiment of a human or machine-readable label with an indicating ink and control colors.
Figure 5:
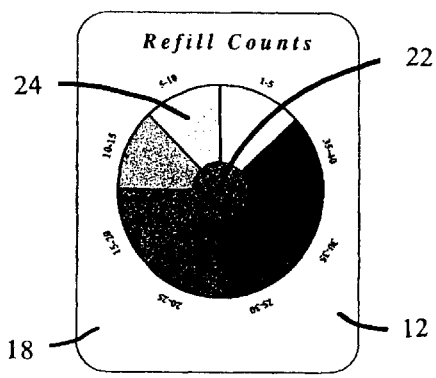
FIG. 5 shows yet another embodiment of a human or machine-readable label with an indicating ink and control colors.
Figure 6:
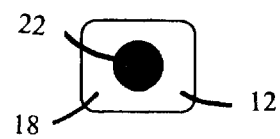
FIG. 6 shows a machine-readable label with an indicating ink.

Examples of the numerous possibilities of labels 12 are found in FIGS. 3–6. The size, shape, geometry, and configuration of these examples can be readily changed to provide labels envisioned within the scope of the invention. The labels 12 of FIGS. 3–5 are human or machine-readable with an indicating ink 22 and the series of control colors 24 that represent groups of refill counts. For the labels 12 of FIGS. 3–5, either a human or a machine can identify the best color match between indicating ink 22 and a series of control colors 24 to determine the number of times that the container 10 has been refilled, sterilized, or otherwise used and exposed to a controlled energy source. For example, in FIG. 4, the indicating ink 22 matches the gradation for 15–20 refill counts as shown by control color 24. The label of FIG. 6 shows a machine-readable label 12 with an indicating ink 22 that can be sensor-read spectrophotometrically. As with all indicating inks 22 of FIGS. 3–6, the spectral response can be machine-correlated to the number of exposure cycles that are accumulated recycle or refill counts.

The label substrate 18 can be a variety of films. Flexible film, such a polymeric film, is preferred. The surface of the substrate 18 is ink-receptive so that an ink can be printed on that surface.

Figure 7:
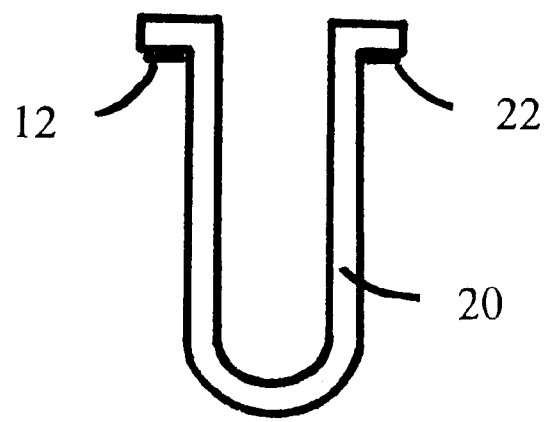
FIG. 7 shows a cross section of a preformed plug.
Figure 8:
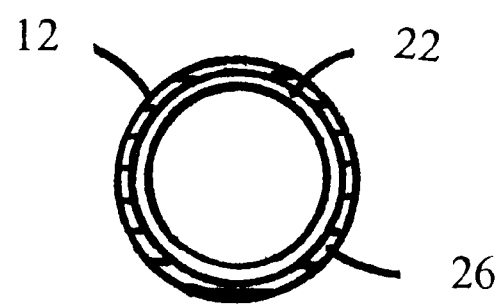
FIG. 8 shows a modified form of a label with both an indicating ink and a code containing color.

Also, the label 12 should be flexible if it is used in a standard preformed mold plug 20 that is formed into a container 10 so that the label 12 can be insert-molded between the container outside wall surface 14 and the container inside wall surface 16. Referring to FIGS. 7 and 8, the preformed plug 20 contains a label 12 with an indicating ink 22 that incrementally changes gradation, either a change in color or shade. The label 12 may be in the form of a rectangular label or preformed ring (FIG. 8). The plug 20 can be formed into a container 10 with the label 12 insert molded between the container outside wall surface 14 and the container inside wall surface 16. Techniques are known for blowing a plug and forming a container.

A preferred ink 22 is an indicating ink that changes color or changes shade when an external energy pulse is applied, such as an electrochromatic or photochromatic pulse. The preferred inks 22 provide a predictable response to the external energy source. For example, the predictable response could be a certain degree of color change or change in shade. A predetermined dose of an energy pulse, such gamma radiation or far ultraviolet (UV) radiation, will produce a measurable difference in color or shade. The dose of the energy pulse can be regulated by a combination of time, power, frequency, wavelength, and the like. The changes in color or shade are preferably incremental so the process of changing color can be repeatedly performed and measured. The preferred indicating ink 22 can accumulate exposures to the energy pulse that results in a gradual and incremental change in the color or shade of the ink each time an energy pulse is applied. This readily predictable color or shade can be correlated to the number of exposures to the energy pulse, which could indicate the number of cycles that a container 10 has been used or the number of times it has been sterilized or other information.

The preferred inks 22 are not significantly responsive to ambient conditions, such as sunlight or heat, that a container 10 may face outside of its processing. Immunity to ambient conditions will prevent changes in color or shade that may alter the measurements from the monitoring or information gathering process. Thus, far UV radiation is preferred to wavelengths in or just beyond the visible spectrum. Other techniques and energies outside the normal ambient or visible conditions are acceptable, such as x-ray (a relatively high-energy photon with a wavelength in the approximate range from 0.05 angstroms to 100 angstroms) or other high energy photons, such as gamma rays. Still other exposures and wavelengths are within the scope of this invention if inks with a predictable response are used.

An indicating ink 22 that is preferred to count cycles in the far UV range is an ink manufactured by Sherwood Technologies of Nottingham, England. Gamma ray sensitive inks and inks responsive to other energy pulses are also acceptable.

In addition to being readily suitable for a countable pulse on refilling the container 10, UV light is known for photobiological effects, and gamma rays have also been used to sterilize containers. Sterilization may be used as part of the cycle counting method, or the information regarding the number of such sterilizations may be information that may be read using the preferred inks and a measuring device, such as a spectrophotometer.

A control color 24 or series of control colors to contrast or compare the indicating ink 22 or any other spectrophotometer-readable color 26 may be included on the label 12. A control color 24, as shown in FIGS. 3–5, can be used so that the color or shade match of the indicating ink 22 with the control color 24 can be human read. If the color or shade match is only intended to be machine-read, then a control color 24 is not necessary.

Other spectrophotometer-readable colors 26 may also be included that do not change color so that information particular to the container 10 may be encoded, such as a batch number, the container supplier, the type of plastic, the year of production, or other information. Also, the label 12 could contain information that may only change once, which may be related to the history of the container 10, such as the maximum temperature exposure or if a container is exposed to a certain amount or type of energy pulse. The codes contained in the label 12 can reflect any information that needs to be monitored.

The size and the shape of the control color 24 or code-containing color 26 are dictated by the processing technologies used to perform the desired functions. The control color 24 and code-containing color 26 can be printed to very specific wavelengths that can be verified for quality control, such as by a spectrophotometer, before the container 10 reaches the end of the production line.

Figure 9:
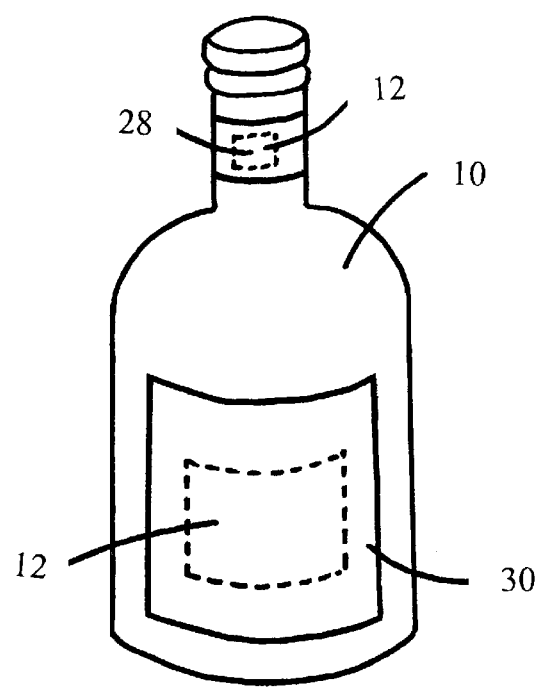
FIG. 9 shows a possible location of a label behind standard labels that may act as filters.

Also, as shown in FIG. 9, a filter 28 may be applied on either side of the inserted label 12 to filter out energies other than the desired wavelength. This filter 28 may be in the form of a standard label 30 on the outside wall surface 14 of a container 10 that filters undesirable energy sources from hitting the inserted label 12, but may be removed during recycling or information gathering process. A standard label 30 maybe any type of label, such as a metalized label, which may include trademarks, product content, or advertising material.

The location of the label 12 in the container 10 can be varied depending on the processes used, the label content, or the size and configuration of the label 12. Factors such as the philosophy of the manufacturer can dictate where the label 12 will be located, such as whether the manufacturer wants to hide the label 12 (as in FIGS. 9 and 10) or wants to make the label readily viewable to promote its efforts in protecting the environment and providing readily refillable or reusable containers (as in FIGS. 11 and 12).

Figure 10:
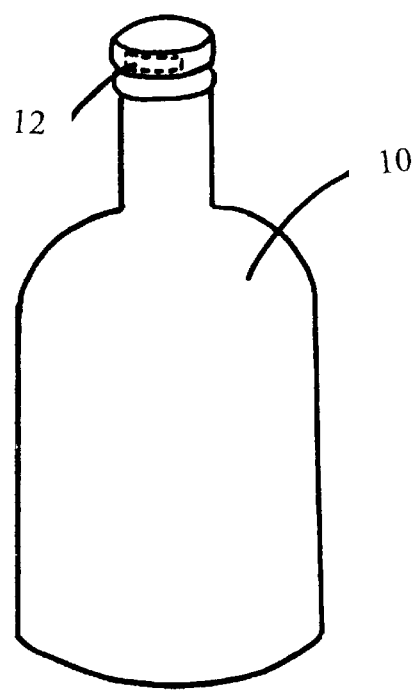
FIG. 10 illustrates another possible location of a label.
Figure 11:
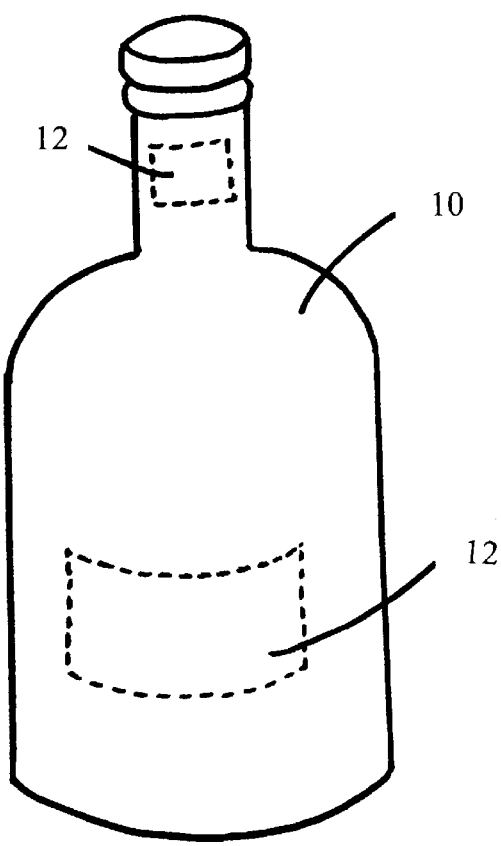
FIG. 11 shows possible readily viewable locations of a label.
Figure 12:
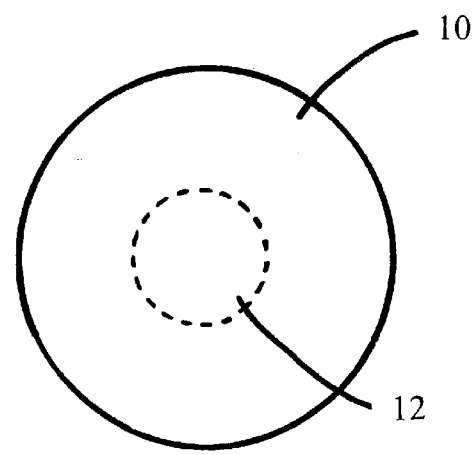
FIG. 12 shows another possible readily viewable location of a label located in the bottom of a container.

Examples of possible locations in the container 10 are shown in FIGS. 1, 9–12. FIG. 1 shows the label 12 in the side wall of the container. FIG. 9 shows the label 12 either in the side wall of the container or on the neck but hidden under a standard label 30. FIG. 10 illustrates that the label 12 can be hidden under a bottle cap when the cap is applied to the container 10. FIGS. 11 and 12 show labels that are readily visible to a customer if human reading or promotion of recycling efforts are desired. In FIG. 12, the label is inserted in the bottom of the container 10, which is a preferred location when first inserted in a preformed plug 20.

The labels 12 described above can be used in a system for bottle or container refiners to count the number of times that a bottle or container 10 has been filled or to otherwise monitor, characterize, or record information and traits regarding containers.

Preferably, the system of recording the numerous cycles or other container information begins with the formation of a container 10 from a plug 20. Referring to FIG. 7, the preformed plug 20 contains a label 12 with an indicating ink 22 that incrementally changes color or changes shade. The label 12 may be in the form of a rectangular label or preformed ring (FIG. 8). The plug 20 can be formed into a container 10 with the label 12 insert molded between the container outside wall surface 14 and the container inside wall surface 16. Techniques are known for blowing a plug and forming a container. The container 10 is then used in its normal manner, and hopefully recycled being refilled or reused.

The recycling process of cleaning and/or sterilizing the container 10 is performed. During the recycling or sterilization process, the container 10 is given a predetermined dose of energy, such a gamma radiation or far UV radiation. This energy, which is preferably machine-induced, causes an incremental change in the color or shade of the indicating ink 22.

A measuring or counting device preferably machine-reads the incremental change in the indicating ink 22 to provide information regarding the container 10, such as the number of times it has been recycled or refilled. Processing technologies, such as using a spectrophotometer, are acceptable methods of gathering such information by measuring the incremental changes to the indicating ink 22.

A human inspector or preferably a machine will compare the color or shade of the indicating ink to a calibration scale or a series of control colors 24. Labels 12 that are suitable for both are shown in FIGS. 3–5. The information is then recorded to reflect the desired results.

Similarly, the container 10 could be coded with very specific wavelengths of color as shown in FIG. 8 that can be read by a spectrophotometer to gather information regarding the container in processing. As mentioned, information related to the history of the container 10, such as the maximum temperature exposure can be monitored. For example, to remove a container from the refilling line that has been exposed to excessive heat, such information related to the history of the container 10 can be monitored. A spectrophotometer can read various information at the same station to process the proper function.

Any machine induced and machine read indicia in the processing line are preferred to human induced or read indicia. The measurements, calibration, processing, or evaluation from the incremental changes in the ink 22 or in the coded information 26 can be processed by a computer. These steps allow for a cost-effective, quick, and highly accurate process of monitoring, characterizing, and recording information and traits regarding containers.

Although the preferred embodiment of the invention is illustrated and described in connection with a particular type of label and container, it can be adapted for use with a variety of containers and systems. Preferably, the system can be used with plastic molded containers, but other types of containers could be adapted to this system. Other embodiments and equivalent labels, containers, systems, and methods are envisioned within the scope of the invention. Various features of the invention have been particularly shown and described in connection with the illustrated embodiments of the invention, however, it must be understood that these particular embodiments merely illustrate and that the invention is to be given its fullest interpretation within the terms of the appended claims.

What is claimed is:

1. A reusable container having a label adapted for monitoring use of the container, comprising
   the container having an inner surface and an outer surface;
   the label having an indicating ink that changes gradation when subjected to an energy source and the ink is not significantly responsive to ambient environmental conditions; and
   a control gradation on the label adjacent to the indicating ink.

2. The container of claim 1 further including a filter label on the outer surface of the container that is removable during processing and is applied on the portion of the outer surface of the container overlying the label adapted for monitoring use to filter out undesirable energy exposure.

3. The container of claim 2 wherein the filter label is a metalized label.

4. The container of claim 1 wherein the indicating ink can incrementally change gradation.

5. The container of claim 1 wherein the label is disposed between the inner surface and the outer surface of the container.

6. The container of claim 1 wherein the indicating ink changes gradation when exposed to far ultraviolet radiation.

7. The container of claim 1 further comprising a series of control gradations on the label adjacent to the indicating ink.

8. A container with a label for monitoring use of the container, the label comprising a substrate with an indicating ink that incrementally changes gradation when an external energy pulse is applied, the substrate including a control gradation on the label adjacent to the indicating ink and comprising a color that does not change with exposure to the energy pulse.

9. The container of claim 8 wherein the indicating ink changes gradation when exposed to far ultraviolet radiation.

10. The container of claim 8 further comprising a control gradations on the label adjacent to the indicating ink.

11. A reusable container having an inner surface and an outer surface and a label adapted for monitoring use of the container, the label being between the inner surface and the outer surface and having an indicating ink that changes gradation when subjected to an energy source and the ink is not significantly responsive to ambient environmental conditions, wherein the indicating ink changes gradation when exposed to far ultraviolet radiation, and further comprising a control gradation on the label adjacent the indicating ink.

12. The reusable container of claim 11 wherein changes in gradation of the ink are incremental and repeatable.

13. The container of claim 11 further comprising a filter label on the outer surface of the container applied on the portion of the outer surface of the container overlying the label between the surfaces.

14. The container of claim 13 wherein the filter label is a metalized label.

15. The container of claim 11 further comprising a series of control gradations on the label adjacent to the indicating ink.

* * * * *

UNITED STATES PATENT AND TRADEMARK OFFICE
CERTIFICATE OF CORRECTION

PATENT NO.   : 6,726,013 B2
DATED        : April 27, 2004
INVENTOR(S)  : Thomas J. Pennaz It is certified that error appears in the above-identified patent and that said Letters Patent is hereby corrected as shown below:

Column 6,
Line 66, please add -- series of -- after "a"

Signed and Sealed this

Tenth Day of August, 2004

JON W. DUDAS
*Acting Director of the United States Patent and Trademark Office*